United States Patent [19]

Anthony

[11] 4,287,426

[45] Sep. 1, 1981

[54] NUCLEAR FUEL STORAGE APPARATUS FOR SEISMIC AREAS

[75] Inventor: Andrew J. Anthony, Tariffville, Conn.

[73] Assignee: Combustion Engineering, Inc., Windsor, Conn.

[21] Appl. No.: 950,103

[22] Filed: Oct. 10, 1978

[51] Int. Cl.³ .............................................. G21F 5/00
[52] U.S. Cl. .................................. 250/506; 250/507; 176/62; 176/78
[58] Field of Search ............... 250/506, 507, 518, 453, 250/456; 61/100; 52/167; 176/75, 87, 66, 78, 62

[56] References Cited

U.S. PATENT DOCUMENTS

| 2,743,224 | 4/1956 | Ohlinger | 176/62 |
| 2,992,176 | 7/1961 | Schoessow | 176/62 |
| 3,037,120 | 5/1962 | McDaniels | 250/506 |
| 3,857,755 | 12/1974 | Kinzer | 176/78 |
| 3,862,884 | 1/1975 | Jabsen | 176/78 |
| 3,986,367 | 10/1976 | Kalpins | 61/100 |
| 4,042,828 | 8/1977 | Rubinstein et al. | 250/506 |
| 4,143,276 | 3/1979 | Mollon | 250/507 |

FOREIGN PATENT DOCUMENTS 999330  9/1952  France ........................................ 176/62

Primary Examiner—Bruce C. Anderson
Attorney, Agent, or Firm—Edward L. Kochey, Jr.

[57] ABSTRACT

An earthquake resistant apparatus for storing nuclear fuel within a water-filled pool wherein a structural grid which supports the fuel is in turn supported by cables from an upper elevation. The grid is located below the water level and spaced from the walls of the pool an amount, preferably at least equal to the anticipated earthquake displacement. The grid is located below the water level a sufficient depth for radiation shielding during fuel handling and storage, and tension members are preferably ten times the design earthquake displacement. A horizontal baffle is located around the periphery of the pool at an elevation above the grid.

9 Claims, 5 Drawing Figures

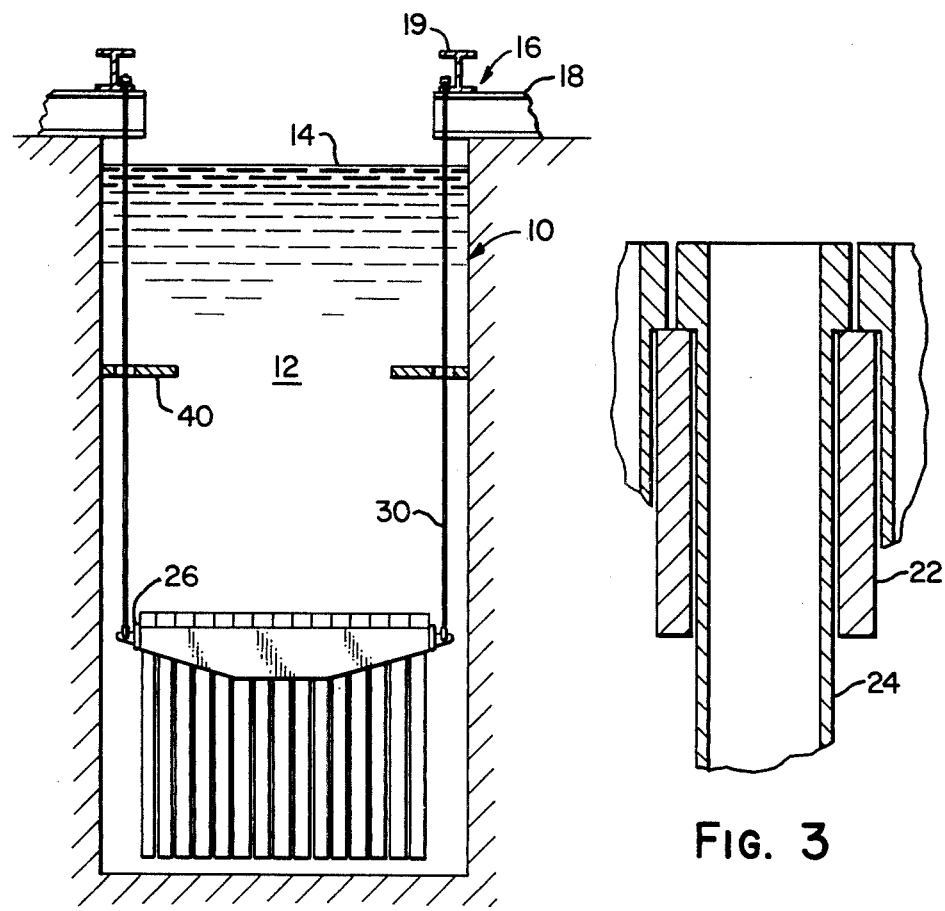
FIG. 1
FIG. 3
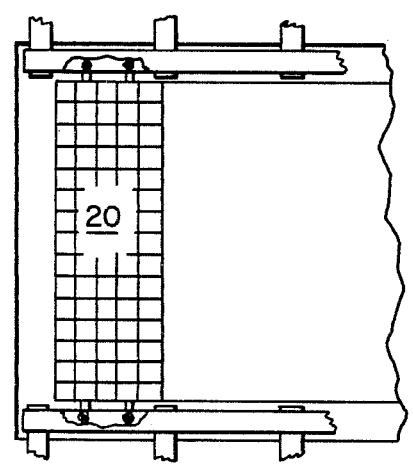
FIG. 2

NUCLEAR FUEL STORAGE APPARATUS FOR SEISMIC AREAS

BACKGROUND OF THE INVENTION

The invention relates to an apparatus for storing spent fuel elements and in particular to a fuel storage apparatus which is resistant to seismic disturbances.

Nuclear fuel assemblies are still active after being removed from a nuclear reactor and, accordingly, are stored in pools of water until their reactivity decays to an acceptable level. The fuel assemblies are spaced either with or without poison material to form a noncritical array and to permit the water of the pool to flow over the elements to cool them.

Various gridwork assemblies both with and without fuel assembly encircling boxes have been supported from the floor of the pool and braced against the walls. The structure must be designed to allow for some expansion since the fuel storage rack will expand differently than the concrete in which it is located. The rack must also be attached to resist seismic forces either by bracing on the walls or by firm attachment to the floor. In either case, provisions for expansion must also be made at these locations.

Since the earthquake forces are transmitted through the storage rack and/or the fuel assemblies and the components of the rack, the individual members must be designed to withstand the resultant forces. This results in expensive construction for a required safe storage rack.

SUMMARY OF THE INVENTION

In the present invention a structural grid for supporting fuel is located underwater in a pool of watertight material. The grid is spaced from the walls of the pool and supported by cables from an upper elevation. Horizontal acceleration due to seismic forces results in a movement of the support members and of the pool walls. The cables being flexible in all directions continue to support the structural grid but will not contribute to horizontal movement of the grid. Accordingly, no significant earthquake forces are transmitted from the supporting structure.

The only horizontal forces on the fuel storage rack will be those due to movement of the water within the pool itself. These will be uniformly distributed on the surfaces; and because of the ability of the water to flow around the components, there will be a tendency to permit the storage rack to remain in its initial position. Sufficient clearance is left from the wall of the pool to allow for zero movement of the storage rack without impacting on the wall. There will inherently be some tolerance in this approach since some acceleration of the storage rack will be caused by the water itself. If the storage rack were to be supported in air rather than water, there is a possibility that the frequency of the earthquake force would approach the natural frequency of the suspension system resulting in wild gyrations of the entire apparatus. However, the presence of the water exerts a damping effect on the vibration of the fuel storage rack, thereby avoiding that problem.

The cables are generally vertical and result in a natural position of the storage rack in the center of the pool. If the length of the cables are ten times the predicted earthquake displacement, the horizontal component of force through the cable during the full displacement is limited to 10 percent of the weight of the fuel storage assembly.

The grid is located substantially below the water level preferably a distance greater than the width of the pool. The surface water will be greatly disturbed during an earthquake, but the predominant movement of the water from one side to the other will be in the upper portion of the pool. The increased depth decreases dynamic forces of water during this period. Horizontal baffles placed around the periphery of the pool at a level above the grid further restrict any vertical movement of water in that area during an earthquake. Accordingly, the dynamic movement of the water will be effectively restricted to that area above the baffle. These baffles need not be watertight and must include provision for horizontal movement of the support cables as they pass through the baffle.

BRIEF DESCRIPTION OF THE DRAWINGS

FIG. 1 is a sectional elevation through the pool illustrating the arrangement of the invention;

FIG. 2 is a plan elevation of FIG. 1 with the baffles omitted;

FIG. 3 is a sectional elevation through the support beams illustrating one method of forming the support grid;

DESCRIPTION OF THE PREFERRED EMBODIMENT

Figure 4:
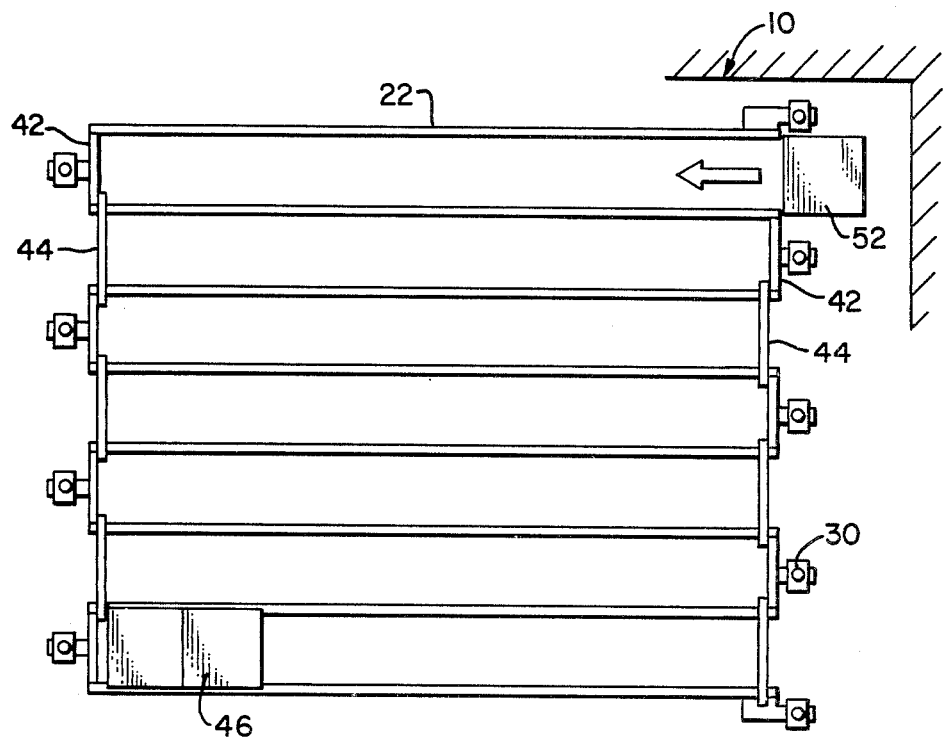
FIG. 4 is a plan view of a fuel storage grid.
Figure 5:
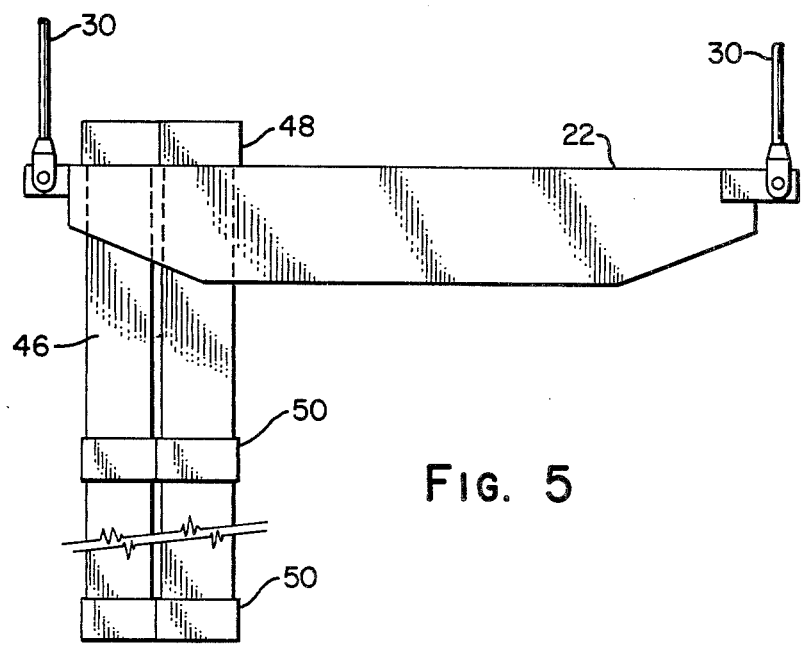
FIG. 5 is an elevation of FIG. 4.

An earth connected pool 10 is filled with water 12 to normal water level 14. An earth connected support structure 16 is formed including horizontal beams 18 which are firmly anchored to the earth and which cantilever out over the pool. Horizontal beams 19 are supported on beams 18 so that the beam runs across the edge of the pool.

A structural grid 20 is formed of grid beams 22 and storage boxes 24. The storage boxes are adapted for storage of fuel assemblies in a conventional manner. End bars 26 connect with the grid beams 24 to form a unitary structure and to retain the storage boxes within the assemblies. In this manner a structural grid for supporting fuel is located within the pool, and other more conventional structures may be used as the structural grid for supporting fuel.

As best seen in FIG. 2, this grid structure is spaced from the wall of the pool. The structural grid is supported by vertical cables 30 which are attached to the structural grid at their lower end and to the earth connected support members 16 at their upper end. These cables operate in tension supporting the grid structure and the fuel contained therein from above. The elevation is selected well below the normal water level of the pool but with the boxes spaced from the floor of the pool. In this manner problems of uneven floor construction which have required leveling operations on prior art storage racks is not a problem. The cables are universally flexible in that they may flex freely in any horizontal direction. While stainless steel cable appears to be the preferred structure at this time, it is, of course, possible to use stiff rods with universal joints or flexible rods. Inasmuch as the earthquake motion may come in any direction they must be free to flex in any direction.

It can be seen that with this construction expansion of the grid with respect to the pool is not a problem since the cables can readily absorb this expansion.

In considering seismic criteria for the design of a fuel storage rack, an initial decision must be made as to the magnitude of the earthquake which is to be considered. The earthquake has a nominal vertical component which is seldom of serious concern and which is not a problem in these storage racks. The horizontal component involves a physical displacement of the earth a given distance with an estimated acceleration. The earth may be displaced on a cyclical basis which is either a uniform frequency or a varying frequency. Conservatism suggests that the spacing between the grid structure and the walls of the pool be at least equal to the predicted earthquake displacement. In an earthquake situation the structural supports 16 are accelerated through a horizontal displacement. The tension members being flexible cannot transmit this force through sheer. The only force which can be transmitted is the horizontal component of the tension when considering the grid to remain in its original position with the support 18 being offset. While the longer the cable 30 is the less force will be transmitted to the grid, it is considered that a ratio of 10 to 1 of cable length to predicted displacement is appropriate. This limits the horizontal force through the grid to one-tenth the weight of the grid even for the maximum displacement. This is contrasted to prior art apparatus where the load placed on the grid is a function of the acceleration of the earthquake rather than the displacement, and the load through the grid may be several times the weight of the storage assembly. It can, thereby, be seen that the dynamic force on the grid structure is substantially reduced.

During an earthquake the walls of the pool will be also displaced, and the water will tend to follow the pool. While the upper surface of the water will splash around, it is noted that a uniform acceleration force would result in a straight water level inclined at some angle with the horizontal. In order to reach this status, some of the water from the lower level side would flow to the higher level side. The primary flow of this water will be in the upper portion of the pool with relatively little flow at the bottom of the pool. Locating the rack below the water level a distance greater than the width of the pool tends to decrease the flow at the rack elevation. Since the water in the lower portion of the pool will be horizontally displaced, it will also exert its influence on the support grid and each of the storage boxes. Because of openings between the boxes, there will be some flow of water through the boxes so that the boxes will not receive the full acceleration force of the water. That force which they do receive, however, will be distributed rather uniformly over the surfaces. Accordingly, while significant acceleration of forces may occur, they will be distributed uniformly rather than imposed on discrete portions of the storage structure as in prior art devices. This movement of the fuel rack by the water creates some tolerance beyond the recommended clearance.

A structure supported in air is not reliably stable in an earthquake situation. Particularly if the earthquake frequency approximates the natural frequency of the structure as supported, wild gyrations can occur. In the present invention, however, the apparatus is supported in water which has a substantial damping effect thereby avoiding the problems experienced by supporting a structure in air.

The support cables are substantially vertical. While some minor deviation from vertical can be accepted, it is important that the cables not be at an angle substantially off vertical. If the cables were to be located at such angles, earthquake movements in various directions would result in a substantial imbalance in loading between the various cables and impose substantial vertical movement of the supported structure.

The support cables 30 as illustrated are shown on two opposing edges of the fuel rack. If desired these cables may be placed around the entire periphery of the rack, or indeed some cables may be located anywhere within the periphery of the fuel rack provided only that the support elevations are essentially directly above the connections to the fuel storage rack.

As a further safeguard against dynamic forces of water sloshing through the pool, horizontal baffles 40 are located around the outer walls of the pool at a location above the structural grid 20. These baffles serve to restrict any tendency of the water to flow upwardly or downwardly at the edge of the pool in response to the changing surface during an earthquake. These baffles need not be watertight and must include provision for movement of the tension members or cables 30 therethrough. This will further stabilize the water in the lower portion of the pool, thereby avoiding detrimental dynamic effects due to the water movement.

Referring now to FIG. 4, a plurality of parallel horizontal support beams 22 are suspended by cables 30. End plates 42 are permanently welded to the beams and the vertical load is transmitted through these plates. Removable end plates 44 consist of rectangular slotted plates which engage the beams from above, thereby restraining the beams from moving away from one another and also operating as retainer plates for fuel storage boxes placed between the support grids.

The fuel storage boxes 46 are rectangular in shape and include support means at the lower portion for supporting later installed fuel assemblies. These boxes may be of stainless steel but are preferably of a boron-containing poison material. Each box includes an upper flange 48 at the upper end which is adapted to rest on support beam 22. Each box also includes externally extending spacers 50 which operate to space the fuel storage boxes from one another after installation.

This simplified less expensive construction of a fuel storage rack is possible because of the decreased level of earthquake forces placed on the fuel storage rack and also due to the improved distribution of those forces which are imposed on the fuel storage rack. This arrangement also permits a compact storage of the fuel assemblies limited only by the physics and criticality of the array with no spacing constraints placed on structural requirements. For this reason, the poison boxes appear more attractive for this fuel storage rack.

Assembly of the fuel storage rack is accomplished by first supporting the support beams 22 from cables 30 within the storage pool. One of the plates 44 is removed, and a fuel storage box 52 is lowered adjacent the location where the end plate was removed. The box is lowered to an elevation such that the support flange 48 is above the support beam while the spacers 50 are below the support beam. The fuel storage box is sized so that the box itself just fits between the support beams, and it is translated horizontally between the support beams to the opposite end plate 42. At this point, it is lowered so that the box is supported by support flange 48. Additional boxes are lowered and placed against the earlier installed boxes in nesting relationship until the space between the two adjacent support beams 22 is full at which time end plate 44 is reinstalled to lock the boxes in place.

This procedure is repeated for other parallel openings either until the complete storage rack is filled or until a number of boxes are installed which meet the current needs. If desired, purchase and installation of the remaining boxes may be deferred until the need for them arises.

The suspended storage rack of this construction is of very low cost and permits deferred expenditure for poison boxes which may be installed remotely at any time. It allows an extremely close permissible spacing between the storage boxes determined only by physics considerations and not by any significant structural restraints.

What is claimed is:

1. An earthquake resistant apparatus for storing nuclear fuel comprising: an earth connected pool formed of watertight material; water within said pool and below the normal water level of said pool; a structural grid for supporting fuel, located within said pool, in spaced relation from the sides thereof; a plurality of earth connected support members; and universally flexible tension members, substantially vertically oriented, attached at the lower end to said structural grid, and at the upper end to said support members.

2. An apparatus as in claim 1 wherein said structural grid is spaced from the walls of said pool a distance at least equal to earthquake displacement design specifications.

3. An apparatus as in claim 1 wherein the vertical distance between the attachment locations of said flexible tension member to said support grid and said support members is at least ten times the design earthquake displacement.

4. An apparatus as in claim 1 wherein said universally flexible tension members are cables.

5. An apparatus as in claim 1 having also a horizontal baffle located on the vertical walls of said pool and around the periphery thereof, said baffle restrained by said walls and located at an elevation above said grid.

6. An apparatus as in claim 1 wherein said grid is located below the water level of said pool a distance greater than the width of said pool.

7. A nuclear fuel storage rack for suspension in a pool of water comprising: a plurality of suspended parallel horizontal support beams; end plates connecting the ends of adjacent support beams as the only connection between adjacent support beams; a plurality of elongated rectangular fuel storage boxes having externally extending upper flanges at the upper end; and said storage boxes located between said parallel support beams in nesting relationship, with the upper flanges resting on said support beams; wherein at least some of said end plates connecting the ends of adjacent beams are individually removable.

8. An apparatus as in claim 7: said storage boxes also having externally extending spacers on a lower portion of said boxes located the same distance from the lower edge of the upper flanges, whereby installed boxes are spaced from one another by said upper flanges at the top and by said spacers at a lower elevation.

9. A method of assembling a nuclear fuel storage rack in a fuel storage pool comprising: suspending a plurality of horizontal and parallel support beams below the normal water level of said pool, connected by end plates at opposite ends; removing an end plate at one end of a pair of parallel beams; lowering a fuel storage box having an external support flange at the upper end and external spacers in the lower portion to an elevation where said support flange is above said beams and the spacer is below said beams; sliding the fuel storage box between said beams and resting the box on said beams by means of said flange; similarly lowering and sliding additional boxes into nesting relationship with the corresponding boxes; and replacing said end plates.

* * * * *

UNITED STATES PATENT OFFICE
CERTIFICATE OF CORRECTION

Patent No. 4,287,426      Dated September 1, 1981

Inventor(s) Andrew J. Anthony

It is certified that error appears in the above-identified patent and that said Letters Patent are hereby corrected as shown below:

Column 5, lines 19 and 20, delete "and below the normal water level of said pool".

Column 5, line 21, after "pool" insert --and below the normal water level of said pool--.

Signed and Sealed this

Seventh Day of September 1982

[SEAL]

Attest:

Attesting Officer

GERALD J. MOSSINGHOFF

Commissioner of Patents and Trademarks